United States Patent
Zappella (10) Patent No.: US 10,162,868 B1
(45) Date of Patent: Dec. 25, 2018

(54) DATA MINING SYSTEM FOR ASSESSING PAIRWISE ITEM SIMILARITY

(71) Applicant: Amazon Technologies, Inc., Seattle, WA (US)

(72) Inventor: Giovanni Zappella, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 345 days.

(21) Appl. No.: 14/657,915

(22) Filed: Mar. 13, 2015

(51) Int. Cl.
*G06F 17/30* (2006.01)

(52) U.S. Cl.
CPC .... *G06F 17/30539* (2013.01); *G06F 17/3053* (2013.01); *G06F 17/30643* (2013.01); *G06F 17/30867* (2013.01)

(58) Field of Classification Search
CPC ......... G06F 17/30864; G06F 17/30867; G06F 17/30241
USPC .............. 707/731; 705/80, 26.8, 2, 35, 7.35, 705/26.62, 14.4, 14.53, 26.1, 26.7
See application file for complete search history.

(56) References Cited

U.S. PATENT DOCUMENTS

| | | | | |
|---|---|---|---|---|
| 6,772,139 B1* | 8/2004 | Smith, III | ......... | G06F 17/30855 707/748 |
| 7,035,864 B1* | 4/2006 | Ferrari | ................. | G06F 3/0482 |
| 7,127,677 B2* | 10/2006 | Chou | ...................... | H04L 67/02 715/741 |
| 7,318,049 B2* | 1/2008 | Iannacci | ................ | G06Q 20/10 705/39 |
| 7,680,703 B1* | 3/2010 | Smith | .................... | G06Q 10/06 705/26.8 |
| 7,685,074 B2 | 3/2010 | Linden et al. | | |
| 7,797,204 B2* | 9/2010 | Balent | .................. | G06Q 10/087 705/26.8 |
| 8,145,512 B1 | 3/2012 | Henne et al. | | |
| 8,285,602 B1* | 10/2012 | Yi | .......................... | G06Q 30/00 705/26.7 |
| 8,290,811 B1* | 10/2012 | Robinson | ........... | G06Q 30/0201 705/14.53 |
| 8,326,658 B1 | 12/2012 | Lee et al. | | |
| 8,380,583 B1* | 2/2013 | Chanda | .............. | G06Q 30/0255 705/26.64 |
| 8,386,519 B2* | 2/2013 | Kenedy | .................. | G06Q 30/02 707/784 |
| 8,412,718 B1* | 4/2013 | Bilger | ................ | G06Q 30/0631 705/14.4 |

(Continued)

*Primary Examiner* — Jeff A Burke
*Assistant Examiner* — Thong H Vu
(74) *Attorney, Agent, or Firm* — Knobbe, Martens, Olson & Bear, LLP (57) ABSTRACT

Data mining systems and methods are disclosed for evaluating pairwise substitutability relationships among items. For example, a pairwise similarity measure may correspond to a value quantifying the extent to which an item A is favored over an item B by a population of users. Given a base item selected by a user, the system may select a candidate item from a set of potential substitute items for the base item based on current estimates of corresponding pairwise similarities. The system may then present the candidate item to the user in a context of comparison against the base item and obtain an indication of user preference between the two. The system may then update corresponding pairwise similarities based on the indication of preference.

23 Claims, 4 Drawing Sheets

(56) References Cited

U.S. PATENT DOCUMENTS

| | | | | |
|---|---|---|---|---|
| 8,684,266 B2* | 4/2014 | Bennett | G06Q 30/0207 235/383 |
| 8,688,732 B1* | 4/2014 | Rajyaguru | G06Q 30/0278 705/26.1 |
| 8,719,855 B2* | 5/2014 | Bedi | G06Q 30/0207 725/19 |
| 9,189,811 B1* | 11/2015 | Bhosle | G06Q 30/0631 |
| 9,202,246 B1* | 12/2015 | Bundy | G06Q 30/0635 |
| 9,824,378 B2* | 11/2017 | Ogrinz | G06Q 30/0603 |
| 2002/0002571 A1* | 1/2002 | Manohar | G06F 17/30873 715/273 |
| 2002/0103789 A1* | 8/2002 | Turnbull | G06F 17/30867 |
| 2002/0143612 A1* | 10/2002 | Barik | G06Q 30/02 705/14.23 |
| 2002/0156773 A1* | 10/2002 | Hildebrand | G01N 33/5091 |
| 2002/0174087 A1* | 11/2002 | Hao | G06F 17/30572 |
| 2003/0009354 A1* | 1/2003 | Arbogast | G06Q 10/06 705/2 |
| 2003/0033215 A1* | 2/2003 | Habiby | G06Q 30/06 705/26.1 |
| 2003/0163399 A1* | 8/2003 | Harper | G06F 17/30893 705/35 |
| 2004/0168121 A1* | 8/2004 | Matz | G06F 17/30867 715/255 |
| 2005/0192870 A1* | 9/2005 | Geddes | G06N 5/04 705/7.12 |
| 2008/0294534 A1* | 11/2008 | Brown | G06Q 30/0206 705/7.35 |
| 2008/0294617 A1* | 11/2008 | Chakrabarti | G06F 17/30867 |
| 2009/0138433 A1* | 5/2009 | Reid | G06F 17/30719 |
| 2011/0093361 A1* | 4/2011 | Morales | G06Q 10/087 705/26.62 |
| 2011/0238525 A1* | 9/2011 | Linden | G06Q 30/02 705/26.7 |
| 2012/0303412 A1* | 11/2012 | Etzioni | G06Q 30/06 705/7.31 |
| 2013/0103592 A1* | 4/2013 | Shenk | G06Q 30/08 705/80 |
| 2013/0179309 A1* | 7/2013 | Heil | G06Q 10/087 705/28 |
| 2014/0115464 A1* | 4/2014 | Shih | G06Q 10/109 715/716 |
| 2014/0279189 A1* | 9/2014 | Kubicki | G06Q 30/0631 705/26.7 |
| 2014/0279211 A1* | 9/2014 | Bruber | G06Q 50/2053 705/26.8 |
| 2016/0103916 A1* | 4/2016 | Even-Zohar | G06F 17/30867 707/738 |

* cited by examiner

DATA MINING SYSTEM FOR ASSESSING PAIRWISE ITEM SIMILARITY

BACKGROUND

A variety of data mining systems and methods are known for detecting associations among items stored or represented in a database. For example, in the context of an electronic catalog of items, data mining processes are frequently used to categorize, cluster, or otherwise group the items into meaningful sets, based on various features associated with the items. Items of each set may be considered likely substitutes for one another. Alternatively or in addition, data mining processes are commonly used to identify items that tend to be viewed, purchased, downloaded, or otherwise selected in combination by users. For instance, items may be identified as likely substitutes for one another if a relatively large number of users viewed the items during the same browsing session. The likely substitutable items identified based on these methods may provide a preliminary basis for recommending alternative items or products to users.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure generally relates to the use of data mining methods for evaluating relationships among items, such as items that are likely substitutes of one another. The items may, for example, be products represented in an electronic catalog, RSS or other feeds to which users can subscribe, travel destinations represented on a travel agency site, or service providers from which services can be requested. More specifically, aspects of the present disclosure will be described with respect to the assessment of a directional relationship between a pair of likely substitutable items (generally referred to as pairwise similarity) based, at least in part, on user actions in a context suggesting or otherwise relating to a comparison of the pair of likely substitutable items. For example, for a given pair of likely substitutable items, A and B, the pairwise similarity may correspond to a value quantifying the extent to which A is favored over B by a population of users. In this example, the direction of the pairwise similarity can be defined as from B to A. The resulting measures of pairwise similarity can be used for various purposes, such as to select items to recommend to users in various contexts.

In accordance with an illustrative embodiment, a computer-implemented pairwise assessment service determines groups of items that are likely substitutable for one another, for example, based on an existing taxonomy of the items or various clustering, categorization, or data association methods. The determined groups of items serve as bases for the assessment of pairwise similarity between items included in each group. Each group of items can be logically represented by an oriented graph, where each item is denoted by a corresponding node. Initially, the oriented graph may not contain any edges between nodes as there might not have been data informing either the associated directions or magnitudes. Alternatively, directional edges of equal magnitude can be randomly assigned to pairs of nodes in the graph. Further, initial edge directions may be determined based on historical data related to item selections, for example, by utilizing the methods or systems disclosed in U.S. Pat. No. 7,680,703, filed Mar. 16, 2010, and entitled "Data Mining System Capable of Generating Pairwise Comparisons of User-selectable Items Based on User Event Histories," the disclosure of which is hereby incorporated by reference in its entirety. Still further, the determination of likely substitutable item groups may be dependent on characteristics of the target user population. For example, the pairwise assessment service may assign different parameters or weights to an applicable item clustering method based on preferences or biases of different user populations, thereby generating distinct sets of likely substitutable items for different user populations.

Figure 2:
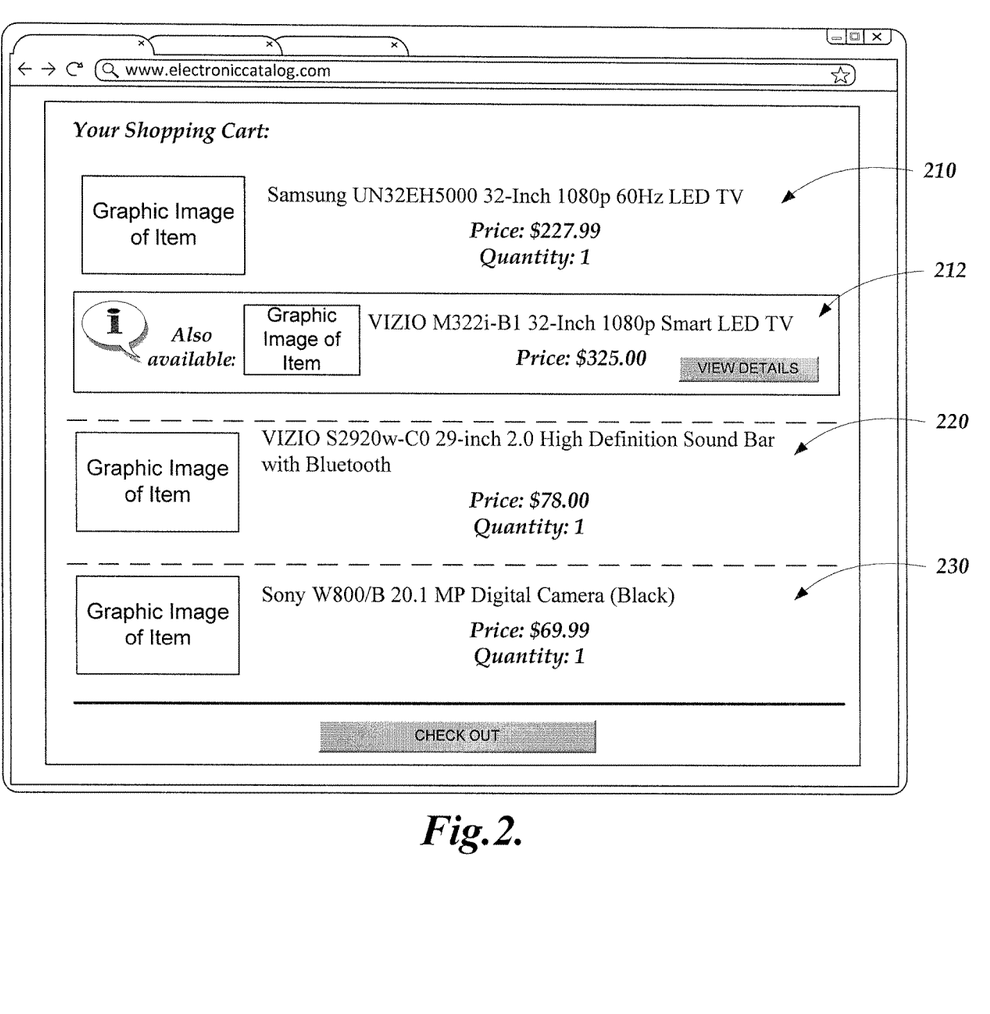
FIG. 2 illustrates an embodiment of a user interface that facilitates assessing pairwise similarities of items.

The pairwise assessment service then implements an exploration and exploitation process to efficiently evaluate pairwise similarities. Given a base item currently selected by a user, the pairwise assessment service strategically selects a candidate item from an item set where both the base item and the candidate item reside, and presents the candidate item to the user in a context of comparison against the base item. For example, FIG. 2 illustrates an embodiment of a user interface that facilitates assessing pairwise similarities of catalog items. As illustrated in FIG. 2, a user has added a base item "Samsung UN32EH5000 32-Inch 1080p 60 Hz LED TV" to the user's electronic shopping cart. The pairwise assessment service in this example has selected the candidate item "VIZIO M322i-B1 32-Inch 1080p Smart LED TV" to present to the user as a suggested alternative to the base item. Subsequently, user interactions with the shopping cart or other related components can be analyzed, from which indications of user preference between the two items can be derived. Illustratively, the user may replace the base item with the suggested candidate item in the shopping cart and complete the purchase. These actions may be considered an indication that the candidate item is favored over the base item. The pairwise assess service may then update the oriented graph that represents corresponding pairwise similarities by reinforcing the edge from the base item node to the candidate item node. These steps can be repeated many rounds until the oriented graph is sufficiently updated.

The selection of a candidate item to pair with a base item for comparison in each round involves a tradeoff between "exploitation" of an expectation that the selected candidate item is highly likely to "defeat" the base item based on previous rounds of trials, and "exploration" to get more information about the pairwise similarities of each pair of nodes. For example, given a base item node, the pairwise assessment service may probabilistically select a candidate item node based on the relative strengths of edges from the base item node to other nodes. Further, the pairwise assessment process may take into account various user characteristics, preferences, or biases. For example, users may be clustered based on their characteristics, preferences, or biases, and the mechanism or formula of the exploitation and exploration tradeoff can be configured differently for distinct clusters of users. Alternatively, the pairwise assessment may use independently configured and implemented processes to assess pairwise similarities of items for different user groups.

Figure 1:
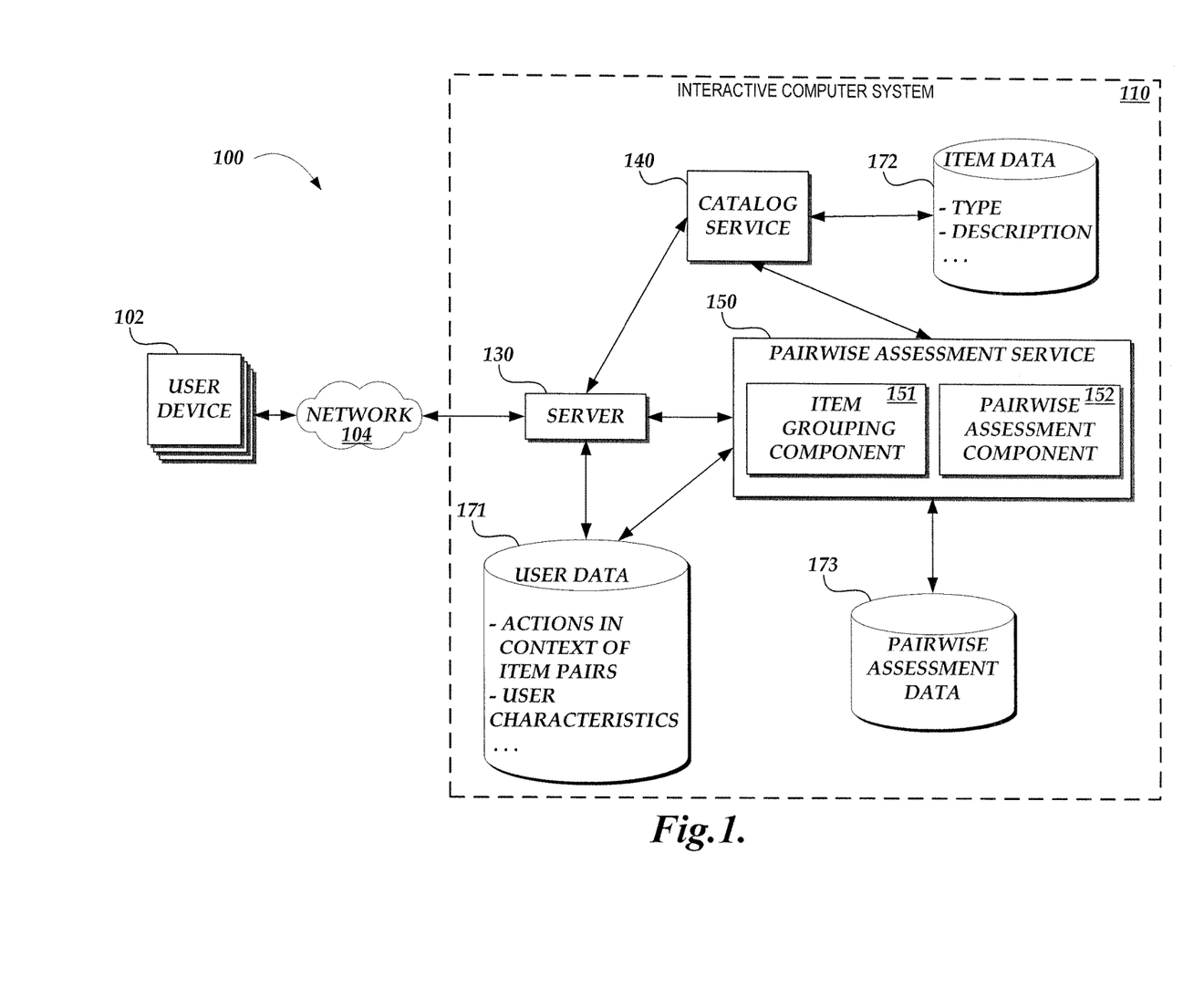
FIG. 1 illustrates an embodiment of a system for assessing pairwise similarities of items.

FIG. 1 depicts an embodiment of a network environment 100 and system 110 capable of assessing pairwise similarities of items using processes and functionalities disclosed herein. In the environment 100, users can access an interactive computer system 110 with user devices 102. The user devices 102 that access the interactive computer system 110 can include, for example, computing devices, such as desktop computers, laptop computers, tablets, personal digital assistants (PDAs), mobile phones, electronic book readers, other wireless handheld devices, set-top or other television boxes, media players, video game platforms, kiosks, and/or the like. The user devices 102 access the interactive computer system 110 over a network 104, which can be a publicly accessible network of linked networks, possibly operated by various distinct parties, such as the Internet. In other embodiments, the network 104 may include a private network, personal area network ("PAN"), LAN, WAN, cable network, satellite network, any other medium of computer data transfer, or some combination thereof.

The interactive computer system 110 can be implemented with one or more physical servers or other computing machines. Each of the components depicted in the interactive computer system 110 can include hardware and/or software for performing various features. In some implementations, the interactive computer system 110 may include specialized hardware for performing one or more processes described herein. For example, in some cases, the pairwise assessment service 150 may be implemented using specialized hardware dedicated to assessing relationships among items based on user activity with respect to an electronic catalog. In one embodiment, the interactive computer system 110 is a network site that allows users to interact with a catalog of items.

In the depicted embodiment, the interactive computer system 110 includes several components that can be implemented in hardware and/or software. For instance, the interactive computer system 110 includes one or more servers 130 for receiving, processing, and responding to requests from user devices 102. The one or more servers 130 can include web servers, application servers, database servers, or other types of servers. The servers 130 can be geographically co-located or geographically dispersed.

The one or more servers 130 and a pairwise assessment service 150 access information about items in an electronic catalog by communicating with a catalog service 140. The catalog service 140 provides access to an item database 172 that may store information about an item catalog, including item details (e.g., type and description), item categories, item relationships, item ratings, customer reviews, author pages, user-generated list pages, forum pages, blog pages, and the like. In one embodiment, at least some of this content is arranged in a hierarchical structure, having items associated with one or more categories or browse nodes in a hierarchy. In accordance with the hierarchy, the catalog service 140 can provide identifications of likely substitutable items classified in the various categories. The catalog service 140 may also provide functionality for users to browse pages in the item hierarchy in addition to searching the catalog. Users can select an item represented in the hierarchy or in a list of search results to view more details about an item.

The interactive computer system 110 also includes the pairwise assessment service 150 that is communicatively connected with the servers 130, a user database 171, and a pairwise assessment database 173. The pairwise assessment service 150 includes an item grouping component 151 and a pairwise assessment component 152.

The user database 171 may store various user features and activity information. User features may include user characteristic or demographic information, such as age, gender, ethnicity, religion, geographic location, occupation, income, spending levels, interests, hobbies, preferences, settings, combinations of the same, and/or the like. User activity information may include information such as a user's purchases, selections, clicks, views, searches, ratings, page requests, additions or removals of items to wish lists and shopping carts, user interface events, tagging activity, combinations of the same, and/or the like. As described above, the pairwise assessment service 150 may customize or configure the pairwise assessment processes based on one or more user features. The pairwise assessment service 150 may also derive indications of user preference between items based on user activity in response to item comparisons caused by the pairwise assessment service 150.

The pairwise assessment database 173 may include relational tables and datasets that store information about pairwise similarities of items. As described above, the pairwise similarities may be logically represented via oriented graphs, in which each node corresponds to an item and each edge between two nodes corresponds to a measure of similarity between two corresponding items. A node may include various item-characterizing features, such as item type, description, ratings, reviews, price, discount, brand, combinations of the same, and/or the like. An edge between nodes may be associated with a direction and one or more values, in either scalar or vector form. As described above, an edge direction from node A to node B may indicate an estimated user preference (typically based on the actions of many users) for an item corresponding to node B over another item corresponding to node A. A corresponding edge value may indicate an estimated degree or extent of user preference between two corresponding items, such as an estimated probability that a user may favor one item over another. Edge values may further be associated with confidence levels or bounds associated with the estimation. In some embodiments, a bidirectional edge or two edges of opposite directions may connect a pair of nodes. In these embodiments, each edge direction may be associated with a respective value.

The oriented graphs may be created and initialized by the item grouping component 151 of the pairwise assessment service 150 based on sets of likely substitutable items. As described above, the sets of likely substitutable items may correspond to different categories or subcategories of items as provided by the catalog service 140. Alternatively or in additional, the item grouping component 151 may perform analysis of users' purchase histories, item viewing histories, or other user activity data, detect associations between specific items, and generate sets of likely substitutable items. For instance, items that are likely substitutes for one another may be detected by analyzing user browsing activity: items that often are viewed together or in succession, such as items viewed during a single browsing session, may be likely substitutes for one another. As an example, if various microwave oven models are viewed in succession—activity that may indicate systematic evaluation of various alternatives—these items may be considered likely substitutes for one another.

The pairwise assessment component 152 may implement exploration and exploitation processes to update the pairwise similarities represented by the oriented graphs. As described above, the pairwise assessment component 152 may obtain data related to user's current selection of base items (e.g., adding an item to shopping cart or wish list, dwelling on an item detail page for an extended period of time, browsing item reviews or ratings, etc.) by communicating with the servers 130 or the user database 171. The pairwise assessment component 152 may then obtain current similarity estimates between the base item and its likely substitutes from a corresponding oriented graph maintained by the pairwise assessment database 173. In some embodiments, the pairwise assessment component 152 uses probabilistic selection or scoring methods to select a candidate substitute item to pair with the base item and prompt the user to compare the two. (In some embodiments, the pairwise assessment component 152 selects the candidate substitute item to present for a given base item before the user has selected the base item.) The pairwise assessment component 152 obtains user action data in the context of the comparison (e.g., by recording the action or actions performed by the user in response to the presentation of the candidate item), quantifies a change to the estimated pairwise similarity between the two items, and updates the corresponding oriented graph maintained by the pairwise assessment database 173. In some embodiments, the pairwise assessment component 152 may further utilize data from third-party providers (e.g., user activity on a social network such as tagging or commenting on an item) to facilitate the process of pairwise similarity assessment.

It should be noted that the processing of the various components of the interactive computer system 110 can be distributed across multiple machines, networks, and other computing resources. The various components of the interactive computer system 110 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

FIG. 2 illustrates an embodiment of a user interface that facilitates assessing pairwise similarities of catalog items (products). To simplify the drawing, some of the information and controls ordinarily included on an electronic shopping cart page (e.g., "remove" or "add" buttons, user reviews, etc.) has been omitted. In this embodiment, a user's electronic shopping cart contains three items 210, 220, and 230. Immediately below item 210 is a message suggesting item 212 as an alternative to item 210. The message also contains information or controls (e.g., the "view details" button) facilitating the user to conduct a comparison between items 210 and 212. It is not necessary that all items in the user's shopping cart be supplemented with a message suggesting a corresponding alternative. In this example, items 220 and 230 are not accompanied with such messages. Further, the suggested item 212 may have an association with other items in the user's shopping cart or otherwise related to the user's characteristics, preferences, biases or other features. In this example, the suggested item 212 shares a same brand "VIZIO" with another item 220 in the user's shopping cart.

Figure 3:
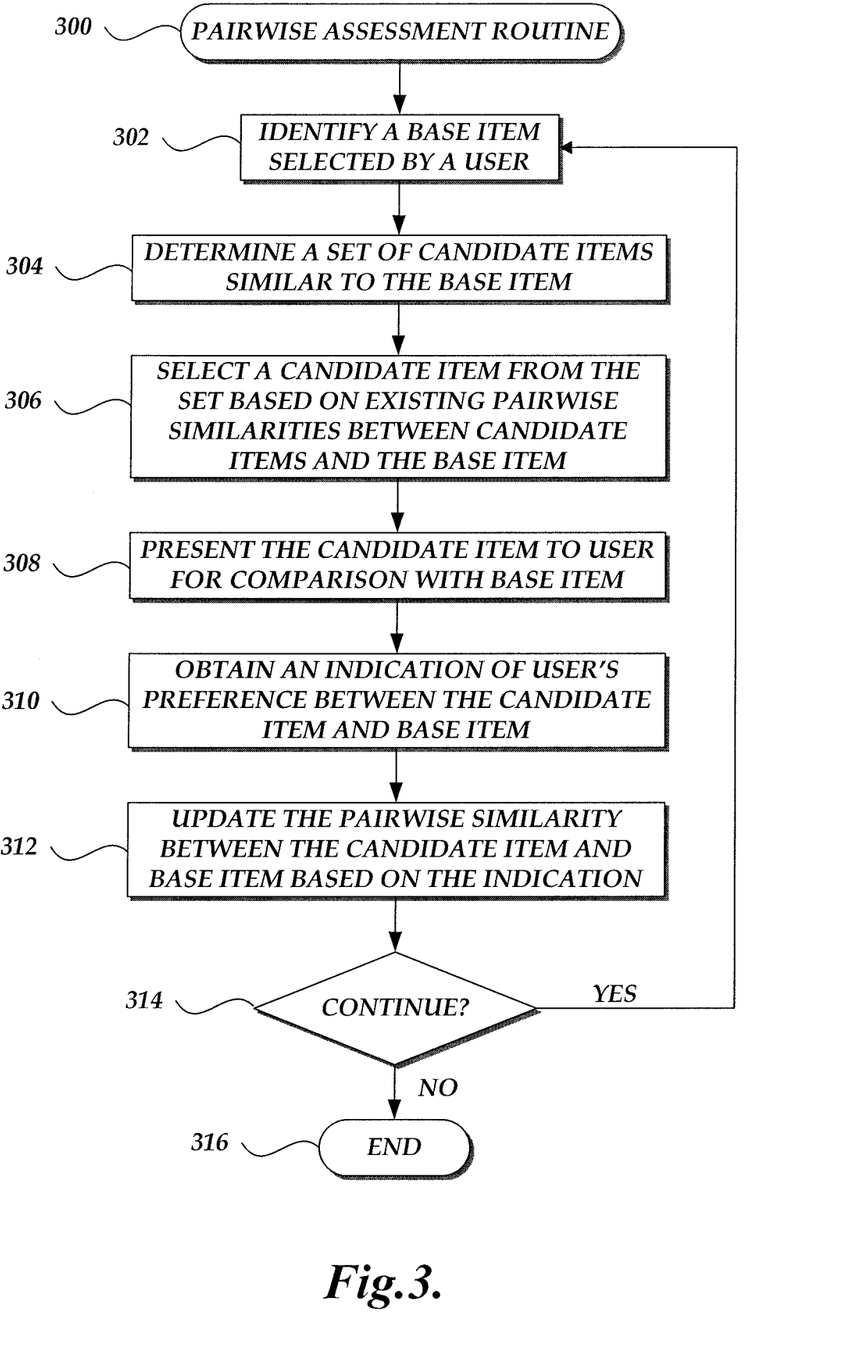
FIG. 3 illustrates an embodiment of a process of assessing pairwise similarities of items.

FIG. 3 illustrates an embodiment of a process of assessing pairwise similarities of items implemented by the pairwise assessment service 150. The pairwise assessment routine of FIG. 3 starts at block 300. At block 302, the pairwise assessment service 150 identifies a base item selected by a user. This can be accomplished by detecting user actions with respect to the base item that indicate the user's interest for acquiring the item, such as adding the base item to a shopping cart or wish list, dwelling on a details page of the base item for an extended period of time, browsing reviews or ratings of the base item, etc.

At block 304, the pairwise assessment service 150 determines a set of candidate items similar to the base item. As described above, the set of candidate items may correspond to at least a subset of likely substitutes for the base item based on an existing taxonomy of items or various clustering, categorization, or other data association methods. For example, the taxonomy of items or data association methods may facilitate generating a list of thousands of items that are potentially substitutable for the base item. However, the list can be filtered based on various features associated with the user or the provider of the items. For example, there may only be hundreds or tens of items on the list that are currently available in a marketplace or can be shipped to the user's address. Alternatively or in addition, the list can be sorted or ordered based on factors such as user reviews or ratings, sales volume, discount or promotions, etc. The pairwise assessment service 150 may obtain a specified number of top items from the ordered list and disregard the rest.

Figure 4:
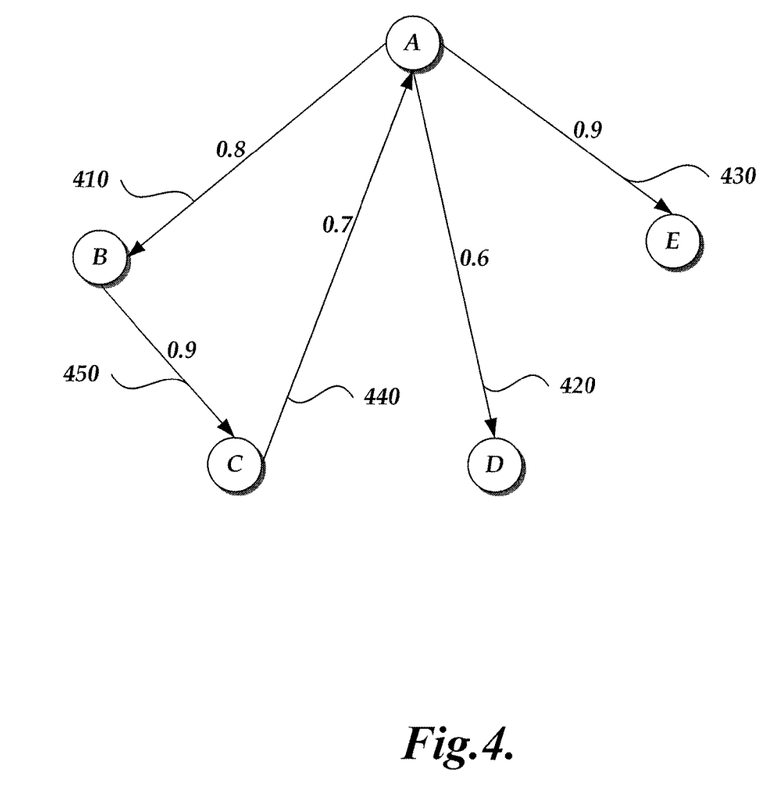
FIG. 4 illustrates an embodiment of a representation of pairwise similarities of items.

At block 306, the pairwise assessment service 150 selects a candidate item from the set of similar items based on currently estimated pairwise similarities between candidate items and the base item. In some embodiments, this selection occurs in response to the user's selection of the base item at block 302. As mentioned above, in other embodiments, this selection may occur before the user's selection of the base item at block 302. As describe above, pairwise similarities of items can be logically represented by oriented graphs, where each node corresponds to an item and each edge between two nodes corresponds to a measure of similarity between two corresponding items. FIG. 4 illustrates an example of the oriented graph. With reference to FIG. 4, a set of five likely substitutable items are represented by five nodes A, B, C, D, and E, respectively. Each of the edges 410, 420, 430, 440, and 450 is associated with a direction indicating an estimated user preference between two corresponding nodes. Each edge is also associated with a numerical value quantifying or otherwise contributing to the computation of the pairwise similarity between two corresponding nodes. For example, edge 410 directed from A to B with a value 0.8 may indicate an estimated user preference of B over A with a probability of 0.8. This estimation may be based on a ratio between a number of users who acquired B to the total number of users who acquired either A or B after a comparison between the two during a specified period of time. In some embodiments, the edge 410 may not be directed and a corresponding edge value can be based on a combination of (1) trials in which B is presented to users who have selected A, and (2) trials in which A is presented to users who have selected B. As described above, the value(s) of an edge may be a scalar or vector, and edge values may be associated with confidence levels or bounds related to their estimation. Further, some edges of the oriented graph may form a circle, such as edges 410, 450, and 440.

With continued reference to FIG. 4, assume the base item requested by the user corresponds to A, the pairwise assessment service 150 may determine the currently estimated pairwise similarities between A and each likely substitute B, C, D or E. In some embodiments, C is excluded from consideration because the direction of edge 440 between A and C indicates that users likely favor A over C. In other embodiments, the pairwise assessment service 150 determines currently estimated pairwise similarities between A and all its likely substitutes as represented by the oriented graph of FIG. 4. For example, the pairwise assessment service 150 may determine that users may prefer B, D, or E over A with respective estimated probabilities of 0.8, 0.6, or 0.9. The pairwise assessment service 150 may also determine that the users may prefer C over A with an estimated probability of (1-0.7), that is, 0.3. In still further embodiments, if no edge currently exists between A and a likely substitute, the pairwise assessment service 150 may assign a default pairwise similarity measure between the two (e.g., a probability of 0.5).

The pairwise assessment service 150 then selects a candidate item that corresponds to one of the neighboring nodes of A, based on the determined pairwise similarities. As described above, the selection involves a tradeoff between "exploitation" of an expectation that the selected candidate item is likely to be favored over the base item by users based on previous rounds of trials, and "exploration" to get more information about the pairwise similarities of each pair of nodes. For example, the pairwise assessment service 150 may probabilistically select from candidate items based on their respective pairwise similarities with the base item. In other words, a candidate item is more likely to be selected if it has a higher estimated pairwise similarity with the base item. The correlation between the likelihood of being selected and the corresponding pairwise similarity can be adjusted or configured by capping, flooring, or applying other numerical constraints or control so that the tradeoff between "exploitation" and "exploration" is properly set for the routine. For example, the likelihood of a candidate item being selected may depend on whether a statistically significant quantity of data (user responses) for a given pair of items has been collected. Continuing the example with reference to FIG. 4, the pairwise assessment service 150 may select B as a candidate, even though edge 430 is associated with a value higher than that of edge 410.

As described above, the pairwise assessment routine may take into account various user characteristics, preferences, or biases. For example, the determination of estimated pairwise similarities may be based on a function or formula that includes both edge value(s) and specific user feature value(s). Accordingly, pairwise similarity between a same pair of items based on a same oriented graph may be different as determined for different users. For example, the edge values can be weighted, combined, or otherwise manipulated using a specific subset or combination of user feature values, depending on the form (e.g., scalar or vector) of both. As another example, users may be clustered based on their characteristics, preferences, or biases, and the mechanism or formula of the exploitation and exploration tradeoff can be configured differently for distinct clusters of users. Alternatively, the pairwise assessment routine may use independently configured or implemented processes to assess pairwise similarities of items for different user groups.

With reference back to FIG. 3, at block 308, the pairwise assessment service 150 presents or causes presentation of the selected candidate item to the user in a context of comparison against the base item. This can be accomplished by presenting a message or other form of information about the candidate item to the user on a Web page or application, where a comparison between the candidate item and the base item is advised, proposed, suggested, or otherwise communicated, explicitly or implicitly. For example, as illustrated in FIG. 2, a candidate item can be presented as an informational message immediately following the base item as listed in the user's shopping cart. Although the comparison is presented on a shopping cart page in this example, it may be presented on another type of page or interface. For example, upon selecting an "add to cart" button corresponding to the base item, the user may be presented with an intermediate comparison page that presents the comparison without displaying the contents of the shopping cart; from this intermediate page, the user can proceed with adding the selected base item to the cart, or can choose instead to add the candidate alternative item to the cart.

With continued reference to FIG. 3, at block 310, the pairwise assessment service 150 obtains an indication of the user's preference between the presented candidate item and the base item, such as by recording the user's next action or sequence of actions. Depending on the context, the user may acquire the candidate item or the base item by purchasing, renting, subscribing to, saving, downloading, tagging, recommending, or otherwise acting on the item in a positive way. If the user acquires the presented candidate item instead of the base item, this may be determined as an indication that the user prefers the candidate item over the base item. Conversely, if the user acquires the base item rather than the presented candidate item, this may be determined as an indication that the user prefers the base item over the candidate item. Illustratively, user interactions with the shopping cart or other related components can be analyzed by the pairwise assessment service 150, from which, indications of user preference between the two items can be derived.

In some embodiments, indications of user preferences can be quantified based on the timing, context, or type of user action with respect to the pairwise comparison. For example, a user's immediate replacement of the base item with the candidate item in shopping cart and completion of purchase may correspond to a strong indication (e.g., a high numerical value) of preference of the candidate item over the base item. As another example, a user's long postponement in purchasing the base item after exposure to the presented candidate item may correspond to a weak indication (e.g., a low numerical value) of preference of the base item over the candidate item.

At block 312, the pairwise assessment service 150 updates the estimated pairwise similarity between the candidate item and the base item based on the obtained indication of preference between the two. Illustratively, the pairwise assessment service 150 determines a change to the pairwise similarity between the candidate item and the base item based on the obtained indication of user preference, and properly updates a corresponding oriented graph to reflect the change, such as by recalculating edge values and/or edge directions. Continuing the example with reference to FIG. 4, the pairwise assessment service may update the value associated with edge 410 by increasing its associated value if the user acquired B instead of A, or decreasing its associated value if the user acquired A instead of B. The update can be done by recalculating corresponding edge values or directions based on a specified number of most recent pairwise comparison trials or based on pairwise comparison data collected during a most recent specified period of time. Alternatively or in addition, various time-decaying methods or techniques can be integrated with the updating step so that more recent pairwise comparison data may play more significant roles in the pairwise assessment process.

At block 314, the pairwise assessment service 150 determines whether to continue the routine with more pairwise comparison trials. Illustratively, the determination can be based on a number of pairwise comparison trials already conducted, an amount of time that the pairwise assessment process has been running, or a measure of stability of estimated pairwise similarities as represented by a corresponding oriented graph. For example, if the average change of edge values for a specified number of most recent updates is smaller than a threshold, the pairwise assessment service 150 may decide not to proceed with additional pairwise comparison trials. In this case, the routine of FIG. 4 terminates at block 316. Otherwise, the pairwise assessment service 150 may decide to continue the routine and proceed to block 302. The service may also ensure that each edge value is ultimately the result of the recorded reactions of a statistically significant number of users (e.g., 100 or more).

Although not illustrated in FIG. 1, the interactive computer system 110 may include one or more recommendation services or components that use the resulting pairwise assessment data to select items to recommend to users. The following are examples of how a recommendation service may use the pairwise assessment data generated for a given base item: (1) the items having the highest pairwise similarity (based on edge values) to the base item may be presented on the item detail page (or other catalog page) for the base item, optionally with messaging such as "users frequently select these alternative items," and optionally with respective percentage values indicating how frequently users select each such alternative item over the base item; (2) when the base item is out-of-stock, discontinued, or otherwise unavailable, messaging may be presented (on the base item's detail page or elsewhere) suggesting one or more of the items having the highest pairwise similarity to the base item; (3) once a user has purchased the base item, the recommendation service may refrain from recommending to the user (for a selected period of time) the items having the highest pairwise similarity to the base item; (4) to provide greater diversity, a set of personalized item recommendations generated for a user may be filtered, prior to presentation to the user, to prevent multiple highly similar items from being recommended in combination.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method, comprising:
   maintaining, in computer storage, a graph data structure comprising a plurality of nodes and a plurality of edges, each node corresponding to a respective catalog item represented in an electronic catalog, each edge connecting a respective pair of nodes and representing a similarity relationship between two catalog items, each edge having a value representing an estimated degree to which users prefer one of the two catalog items over the other;
   identifying, for a first item represented in the electronic catalog, a second item that is a candidate substitute for the first item, said first and second items corresponding to first and second nodes, respectively, of the graph data structure, the first and second nodes connected by a first edge having a first value representing an estimated degree to which users prefer the first item over the second item;
   for individual users of a plurality of users who select the first item for acquisition, outputting to the respective user, responsive to the selection of the first item and prior to acquisition by the respective user of the first item, a pairwise similarity assessment user interface displaying a substitute item display element that includes a representation of the second item and enables the respective user to replace the first item with the second item in an electronic shopping cart;
   obtaining event data reflective of whether the individual users replace the first item with the second item in response to the substitute item display element, the event data including recorded actions of the individual users performed in response to displaying the substitute item display element; and
   updating the first value in the graph data structure based at least partly on the recorded actions of the event data;
   the method performed programmatically by a computing system under control of executable program code.

2. The method of claim 1 further comprising:
   for individual users of the plurality of users who select the second item for acquisition, outputting to the respective user, responsive to the selection of the second item and prior to acquisition by the respective user of the second item, a second user interface displaying a second substitute item display element that includes a representation of the first item; and
   recording second event data reflective of how the users respond to the second substitute item display element;
   wherein the pairwise similarity score is based additionally on the second event data.

3. The method of claim 1, wherein identifying the second item comprises probabilistically sampling a subset of items represented in the electronic catalog based, at least in part, on respective pairwise similarity scores associated with individual items of the subset and the first item.

4. The method of claim 1, wherein individual users of the plurality of users select the first item for acquisition by adding the first item to an electronic shopping cart.

5. The method of claim 1, wherein the event data corresponds to at least one of purchasing, renting, subscribing to, adding to a wish list, saving, downloading, installing, tagging, or recommending one of the first item or second item.

6. The method of claim 1, wherein a direction of the edge between the first node and the second node indicates, between the first item and the second item, which item users prefer.

7. The method of claim 6, further comprising:
   determining that another user selects the first item for acquisition;
   accessing the graph data structure;
   identifying the second item as a potential substitute for the first item based on the first value of the edge connecting the first node corresponding to the first item with the second node corresponding to the second item; and
   outputting to the another user, responsive to the selection of the first item and prior to acquisition by the another user of the first item, the user interface displaying the substitute item display element that includes second item and enables the respective user to replace the first item with the second item in an electronic shopping cart.

8. The method of claim 1, further comprising:
   determining that another user selects the first item for acquisition;
   identifying the second item as a potential substitute for the first item based on the first value; and
   outputting to the another user, responsive to the selection of the first item and prior to acquisition by the another user of the first item, the user interface displaying the substitute item display element that includes second item and enables the respective user to replace the first item with the second item in an electronic shopping cart.

9. The method of claim 1, wherein identifying the second item comprises selecting the second item based at least partly on a determination that a statistically significant quantity of user behavioral data has not yet been collected for performing a pairwise comparison between the first item and the second item.

10. A non-transitory computer readable storage medium storing computer executable instructions that instruct a computing system comprising one or more processors to perform operations comprising:
    for a base item selected by a user, determining a candidate item from a subset of items in response to the selection of the base item by the user and based, at least in part, on pairwise similarity data for items included in the subset, the pairwise similarity data representing a degree to which the candidate item is selected, via a substitute item display element presented to a plurality of users who select the base item for acquisition, to replace the base item in an electronic shopping cart, the pairwise similarity data stored in computer storage in a graph data structure in which items are represented by respective nodes and in which similarity relationships between the items are represented by edges, each edge connecting a respective pair of nodes and having a value representing a measure of user preference for one item over another item;

causing presentation to the user of a pairwise similarity assessment user interface including the base item and the substitute item display element including the candidate item;

obtaining an indication of whether the user selected to replace the base item with the candidate item in the electronic shopping cart, the indication based on recorded activity of the user in response to the presentation of the substitute item display element; and updating the pairwise similarity data based at least partly on the indication, wherein updating the pairwise similarity data comprises generating or updating a first value for an edge that connects a first node to a second node in the graph data structure, the first node representing the base item and the second node representing the candidate item, the first value representing an estimated preference of users for the base item over the candidate item or vice versa.

11. The non-transitory computer readable storage medium of claim 10, wherein the base item belongs to a set of items included in an electronic catalog, wherein individual items of the set of items are potentially substitutable for one another based, at least in part, on a criterion and wherein the subset of items are selected from the set of items included in the electronic catalog.

12. The non-transitory computer readable storage medium of claim 11, wherein the operations further comprise obtaining the similarity data indicating respective pairwise similarities between individual items of the subset of items and the base item.

13. The non-transitory computer readable storage medium of claim 11, wherein the criterion corresponds to a taxonomy or hierarchy of items included in the electronic catalog.

14. The non-transitory computer readable storage medium of claim 11, wherein the criterion is based, at least in part, on items viewed by a second user in a session.

15. The non-transitory computer readable storage medium of claim 10, wherein the edge has a direction which specifies, between the base item and the candidate item, which item is preferred by users.

16. The non-transitory computer readable storage medium of claim 10, wherein the operations further comprise determining the subset of items based, at least in part, on an availability of the subset of items to the user.

17. The non-transitory computer readable storage medium of claim 10, wherein determining the candidate item comprises selecting the candidate item based at least partly on a determination that a statistically significant quantity of user behavioral data has not yet been collected for performing a pairwise comparison between the base item and the candidate item.

18. A system comprising:

a data store configured to at least store computer-executable instructions; and a hardware processor in communication with the data store, the hardware processor configured to execute the computer-executable instructions to at least:

for a base item included in a set of items, determine a candidate item from the set of items in response to a selection of the base item by a user and based, at least in part, on pairwise similarity data for items included in the set, the pairwise similarity data representing a degree to which the candidate item is selected, via a substitute item display element presented to a plurality of users who select the base item for acquisition, to replace the base item in an electronic shopping cart, the pairwise similarity data stored in computer storage in a graph data structure in which items are represented by respective nodes and in which similarity relationships between the items are represented by edges, each edge connecting a respective pair of nodes and having a value representing a measure of user preference for one item over another item;

cause presentation to the user of a pairwise similarity assessment user interface including the base item and the substitute item display element including the candidate item;

obtain an indication of whether the user selected to replace the base item with the candidate item in the electronic shopping cart, the indication based on recorded actions of the user performed in response to the presentation of the candidate item; and update the pairwise similarity data based at least partly on the indication, wherein updating the pairwise similarity data comprises generating or updating a first value for an edge that connects a first node to a second node in the graph data structure, the first node representing the base item and the second node representing the candidate item, the first value representing an estimated preference of users for the base item over the candidate item or vice versa.

19. The system of claim 18, wherein the hardware processor is further configured to:

for a second base item included in the set of items, determine a second candidate item from the set of items based, at least in part, on the updated similarity data;

cause presentation of the second candidate item to a second user in a context including the second base item;

obtain a second indication of the second user's preference between the second candidate item and the second base item in response to the presentation of the second candidate item; and update the pairwise similarity data based on the second indication.

20. The system of claim 19, wherein the second user shares one or more common features with the user.

21. The system of claim 18, wherein the hardware processor is further configured to determine the candidate item from the set of items based, at least in part, on one or more features associated with the user.

22. The system of claim 18, wherein the indication of the user's preference corresponds to the user's acquisition of the candidate item or the base item.

23. The system of claim 18, wherein updating the pairwise similarity data comprises updating a directional pairwise similarity measure for the candidate item and the base item based, at least in part, on the indication.

\* \* \* \* \*